(12) United States Patent
Mine

(10) Patent No.: US 10,063,795 B2
(45) Date of Patent: Aug. 28, 2018

(54) IMAGE CAPTURING APPARATUS, METHOD FOR CONTROLLING THE SAME, AND STORAGE MEDIUM

(71) Applicant: CANON KABUSHIKI KAISHA, Tokyo (JP)

(72) Inventor: Yosuke Mine, Tama (JP)

(73) Assignee: Canon Kabushiki Kaisha, Tokyo (JP)

( * ) Notice: Subject to any disclaimer, the term of this patent is extended or adjusted under 35 U.S.C. 154(b) by 397 days.

(21) Appl. No.: 14/739,904

(22) Filed: Jun. 15, 2015

(65) Prior Publication Data

US 2015/0365609 A1  Dec. 17, 2015

(30) Foreign Application Priority Data

Jun. 16, 2014 (JP) .................................. 2014-123807
Jun. 16, 2014 (JP) .................................. 2014-123809

(51) Int. Cl.
*H04N 5/33* (2006.01)
*H04N 5/225* (2006.01)
*H04N 5/232* (2006.01)
*H04N 5/235* (2006.01)

(52) U.S. Cl.
CPC .......... *H04N 5/332* (2013.01); *H04N 5/2258* (2013.01); *H04N 5/2351* (2013.01); *H04N 5/23212* (2013.01); *H04N 5/2354* (2013.01); *H04N 2209/047* (2013.01)

(58) Field of Classification Search
CPC .. H04N 5/332; H04N 5/23212; H04N 5/2258; H04N 5/2351; H04N 2209/047; H04N 5/2354
See application file for complete search history.

(56) References Cited

FOREIGN PATENT DOCUMENTS

| JP | 2002-202541 A | 7/2002 |
| JP | 2006-098771 A | 4/2006 |
| JP | 2012-010282 A | 1/2012 |

*Primary Examiner* — Twyler Haskins
*Assistant Examiner* — Angel L Garces-Rivera

(57) ABSTRACT

An image capturing apparatus includes a photometric sensor having a plurality of pixels having a sensitivity to an infrared light range and a visible light range, an acquisition unit that divides the photometric sensor into a plurality of pixel groups and acquires image information of the infrared light range and image information of the visible light range in each of the plurality of pixel groups, a subtraction unit that generates a visible light component obtained by subtracting an infrared light component that is based on the image information of the infrared light range from the image information of each of the plurality of pixel groups, and a processing unit that performs at least one of light source determination processing, specific color detection processing, and exposure amount determination processing, using the visible light component generated by the subtraction unit.

11 Claims, 12 Drawing Sheets

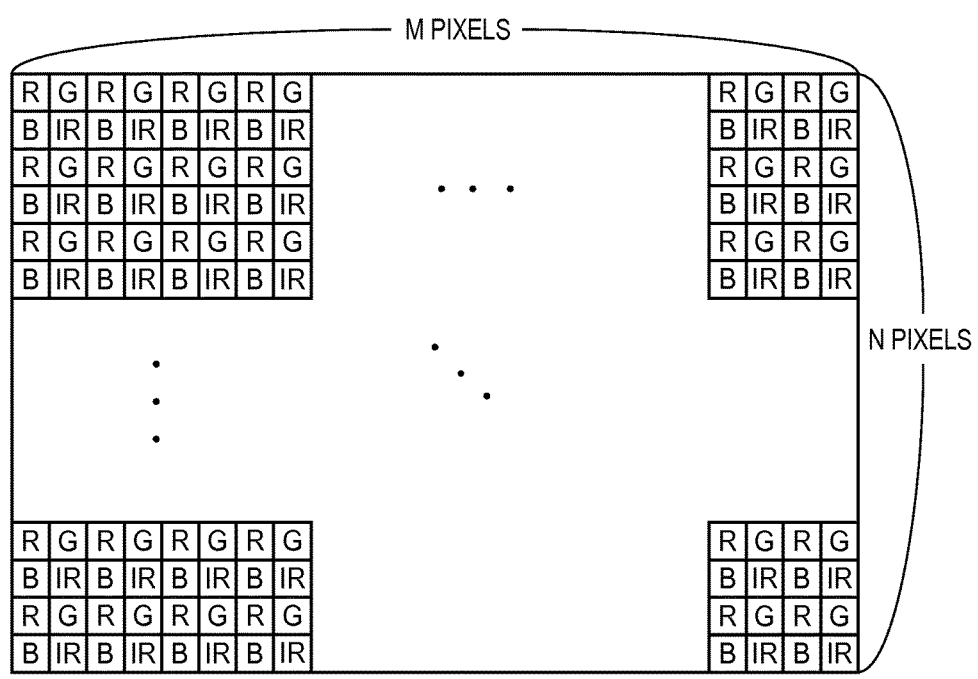
F I G. 4

R, G, B, IR SPECTRAL CHARACTERISTICS

R', G', B' SPECTRAL CHARACTERISTICS

R, G, B SPECTRAL CHARACTERISTICS OF IMAGE SENSOR
FOR PHOTOGRAPHY

LED SPECTRAL CHARACTERISTICS

SPECTRAL CHARACTERISTICS IN SUNLIGHT (WHEN FINE WEATHER)

FLESH COLOR SPECTRAL CHARACTERISTICS

SPECTRAL CHARACTERISTICS OF BLACK FIBER
CONTAINING INFRARED RAY REFLECTOR

UNDER LED LIGHT SOURCE

IN SUNLIGHT (CLEAR WEATHER)

UNDER LED LIGHT SOURCE

IN SUNLIGHT (CLEAR WEATHER)

FOCUS DETECTION CIRCUIT SPECTRAL CHARACTERISTICS

FOCUSING POSITION DISPLACEMENT

IMAGE CAPTURING APPARATUS, METHOD FOR CONTROLLING THE SAME, AND STORAGE MEDIUM

BACKGROUND OF THE INVENTION

Field of the Invention

The present invention relates to an image capturing apparatus and a method for controlling the image capturing apparatus.

Description of the Related Art

Light that a human can perceive is, in general, light in the range from approximately 400 nm to approximately 680 nm (hereinafter, "visible light range"). Conventionally, in an image capturing apparatus such as a digital camera or a digital video camera, a filter for removing light in the ultraviolet light range up to 400 nm, a filter for removing light in the infrared light range from 680 nm, or the like is arranged in front of an image sensor for image capturing, in order to take in only the light in the aforementioned visible light range.

On the other hand, there is also a desire to detect infrared light in order to perform light source determination in an image capturing apparatus. For example, in Japanese Patent Laid-Open No. 2012-10282, the type of a light source is determined from an image containing light in the visible light range and in the infrared light range, and shooting conditions are controlled in accordance with the type of the light source.

Also, Japanese Patent Laid-Open No. 2002-202541 discloses a configuration in which two light-receiving elements sensitive to a wavelength band including the infrared light range and the visible light range are arranged in a photometric sensor in a single-lens reflex camera, and a visible light cut filter is arranged in an incident light region of one of the light receiving elements. Infrared remote control reception and light source determination are performed using the output from a light-receiving surface on which the visible light cut filter is arranged. The output corresponding to that of a light-receiving surface sensitive only to the visible light range can also be obtained by obtaining a difference between outputs of the two light-receiving surfaces. By performing photometry using these visible light range components, a photometric result can be brought closer to spectral characteristics of the image sensor.

However, if the conventional techniques disclosed in the aforementioned documents are to be used in a specific color detection sensor in a single-lens reflex camera, the following problem will arise.

In the case of detecting a specific color such as a flesh color, a plurality of color filters having different spectral transmittances in the visible light range are necessary. This is because if the color filters are sensitive to the infrared light range as well as the visible light range, the hue shifts when the color filters are in sunlight that radiates infrared light and when under an artificial light source such as an LED that does not radiate infrared light.

In the technique disclosed in Japanese Patent Laid-Open No. 2012-10282, an imaging apparatus is also sensitive to the infrared light range in order to perform light source determination processing. For this reason, if a plurality of color filters having different spectral transmittances within the visible light range cannot be provided, specific color detection processing cannot be performed.

With the technique disclosed in Japanese Patent Laid-Open No. 2002-202541, the output corresponding to that of a light-receiving surface sensitive only to the visible light range can be obtained by obtaining a difference between outputs of the two light-receiving surfaces, but a plurality of color filters having different spectral transmittances within the visible light range are not provided, and therefore specific color detection processing cannot be performed.

From another viewpoint, it is desired to detect infrared light in order to suppress a focus shift caused due to the type of a light source in an image capturing apparatus. For example, in Japanese Patent Laid-Open No. 2006-98771, a wavelength component detection sensor for detecting the visible light range and the infrared light range is arranged, and a defocus amount detected by a focus detection sensor is corrected in accordance with a difference between two outputs.

However, if the sensor disclosed in Japanese Patent Laid-Open No. 2006-98771 is to be used as a photometric sensor in a single-lens reflex camera, the following problem will arise.

In the technique disclosed in Japanese Patent Laid-Open No. 2006-98771, sensitive to the infrared light range is used. For this reason, if exposure amount determination computation for a photographic sensor is performed using the aforementioned sensor, a shift occurs in a photometric result due to a sensitivity difference in the infrared light range between the sensors.

SUMMARY OF THE INVENTION

The present invention has been made in view of the above-described problems, and provides an image capturing apparatus that can favorably perform processing using a photometric sensor having a plurality of pixels which are sensitive to the infrared light range and the visible light range.

According to a first aspect of the invention, there is provided an image capturing apparatus comprising: a first image sensor in which a first pixel group whose sensitivity to visible light is higher than a sensitivity thereof to infrared light, and a second pixel group that has a sensitivity to infrared light and has a lower sensitivity to visible light than that of the first pixel group, are arranged on the same plane; a first calculation unit that calculates a first evaluation value based on a pixel signal of the first pixel group without subtracting an infrared light component that is based on a pixel signal of the second pixel group from the pixel signal of the first pixel group; a second calculation unit that calculates a second evaluation value by subtracting the infrared light component that is based on the pixel signal of the second pixel group from the pixel signal of the first pixel group or the first evaluation value; a first processing unit that performs first processing based on the first evaluation value; and a second processing unit that performs second processing that is different from the first processing based on the second evaluation value.

According to a second aspect of the invention, there is provided a method for controlling an image capturing apparatus having a first image sensor in which a first pixel group whose sensitivity to visible light is higher than a sensitivity thereof to infrared light, and a second pixel group that has a sensitivity to infrared light and has a lower sensitivity to visible light than that of the first pixel group, are arranged on the same plane, the method comprising: a first calculation step of calculating a first evaluation value based on a pixel signal of the first pixel group without subtracting an infrared light component that is based on a pixel signal of the second pixel group from the pixel signal of the first pixel group; a second calculation step of calculating a second evaluation value by subtracting the infrared light component that is based on the pixel signal of the second pixel group from the pixel signal of the first pixel group or the first evaluation value; a first processing step of performing first processing based on the first evaluation value; and a second processing step of performing second processing that is different from the first processing based on the second evaluation value.

Further features of the present invention will become apparent from the following description of exemplary embodiments with reference to the attached drawings.

BRIEF DESCRIPTION OF THE DRAWINGS

FIG. 4 is a diagram for illustrating a pixel array in the image capturing apparatus in the first embodiment.

DESCRIPTION OF THE EMBODIMENTS

Hereinafter, embodiments of the present invention will be described in detail with reference to the attached drawings.

First Embodiment

Figure 1:
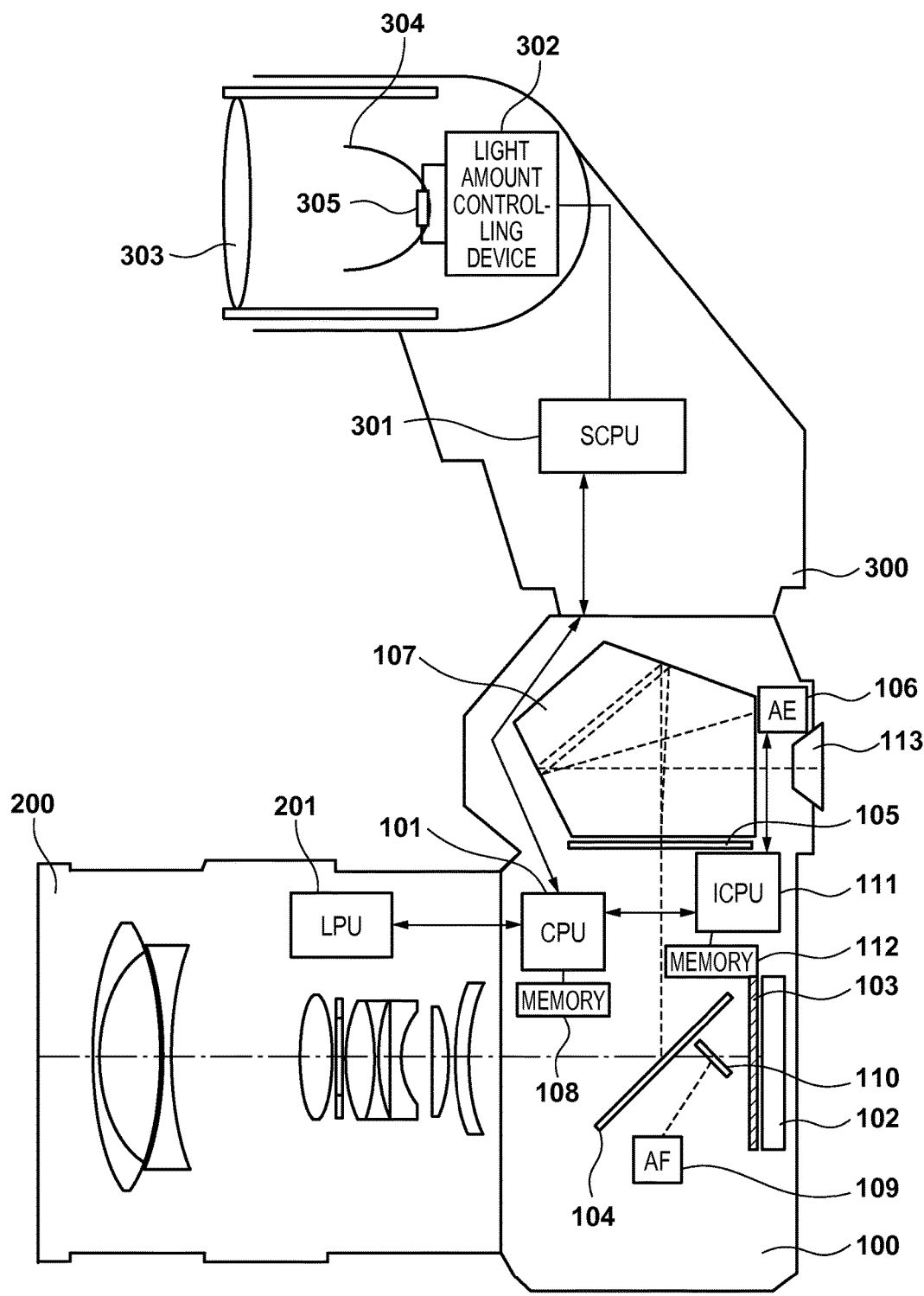
FIG. 1 is a block diagram showing a configuration of an image capturing apparatus according to a first embodiment of the present invention.

FIG. 1 is a diagram showing a configuration of an image capturing apparatus (camera system) according to a first embodiment of the present invention. In FIG. 1, 100 denotes a camera body, 200 denotes a lens, and 300 denotes an illuminating device (flash).

First, a configuration of the camera body 100 and the lens 200 will be described. 101 denotes a CPU (hereinafter, "camera microcomputer"), which is a microcomputer that controls each part of the camera 100. 102 denotes a photographic image sensor, such as CCD or a CMOS sensor including an infrared cut filter, a low pass filter, and the like, and an object image is formed on an imaging plane of the image sensor 102 by the lens 200. 103 denotes a shutter, which shields the image sensor 102 from light when not shooting an image, and opens when shooting an image to lead light rays to the image sensor 102.

104 denotes a half mirror, which reflects a part of light entering from the lens 200 when not shooting an image, and causes the reflected light to form an image on a focusing screen 105. 106 denotes a photometric sensor, which performs light source determination processing, specific color detection processing, and photometric processing, using an image sensor such as a CCD or a CMOS sensor. In the present embodiment, a description will be given later, using FIGS. 4, 5A, and 5B, of the case of using, as the photometric sensor 106, a CMOS sensor with a Bayer pattern in which R (red), G (green), B (blue), and IR (infrared light) pixels are arranged on the same plane.

The photometric sensor 106 is sensitive to the visible light range and the infrared light range as mentioned above, and is arranged at a position at which some light rays enter that are out of the optical axis in the light which has been scattered at the focusing screen 105 and passed through a pentaprism 107. 107 denotes the pentaprism, which guides the object image formed on the focusing screen 105 to the photometric sensor 106 and an eye piece 113. 108 is a memory such as a RAM or a ROM that is connected to the CPU 101.

109 denotes a focus detection circuit. Some light rays that have entered from the lens 200 and passed through the half mirror 104 are reflected at a sub-mirror 110 and guided to a focus detection sensor within a focus detection circuit 109, and focus detection is performed. 111 denotes a CPU (hereinafter referred to as an ICPU) for image processing and computation of the photometric sensor 106. 112 is a memory such as a RAM or a ROM that is connected to the ICPU 111. 113 denotes the eye piece with which a user checks the field. Although the ICPU 111 dedicated for the photometric sensor 106 is prepared in the present embodiment, it should be noted the photometric sensor 106 may be controlled using the camera microcomputer 101. 201 denotes a CPU within the lens (hereinafter referred to as an LPU), and this LPU sends information of the distance to an object or the like to the camera microcomputer 101.

Next, a configuration of the flash 300 will be described. 301 denotes a microcomputer SCPU (hereinafter referred to as a flash microcomputer) that controls operations of each part of the flash 300. 302 denotes a light amount control device, which includes a booster circuit for boosting a battery voltage to cause a light source 305 to light, a current control circuit that controls start and stop of light emission, and the like. 303 denotes a zoom optical system that includes a panel of a Fresnel lens or the like, and changes a radiation angle of the flash 300. 304 denotes a reflector, which collects light beams emitted from the light source and radiates the collected light to an object. 305 denotes a light source such as a xenon tube or a white LED.

Next, operations of the camera body 100 will be described with reference to the flowcharts shown in FIGS. 2 and 3. Note that it is assumed here that the camera 100 has been turned on and is in a photography standby state.

In step S101, the CPU 101 determines whether or not a first stroke (hereinafter referred to as SW1) of a shutter switch has been turned on, and if the SW1 has been turned on, the CPU 101 advances the processing to step S102. In step S102, the ICPU 111 drives the photometric sensor 106. Note that the details of the driving of the photometric sensor 106 will be described later with reference to FIG. 3.

In step S103, the CPU 101 or the ICPU 111 performs AF (autofocus) processing in a known phase difference method. An AF evaluation value is calculated, a focusing lens in the lens 200 is driven via the LPU 201, and the focusing lens is moved to a focusing lens position at which the AF evaluation value is highest.

In step S104, the CPU 101 determines whether or not a second stroke (hereinafter referred to as SW2) of the shutter switch has been turned on. If the shutter switch SW2 is in an off state, in step S105, the CPU 101 checks the status of the shutter switch SW1. If the shutter switch SW1 remains in an on state, the CPU 101 returns the processing to step S102, and if the shutter switch SW1 has been turned off, the CPU 101 returns the processing to step S101.

In step S104, if the shutter switch SW2 is in an on state, in step S106, the CPU 101 executes actual image capturing processing, based on exposure control values obtained in photometric sensor processing in step S102.

Figure 2:
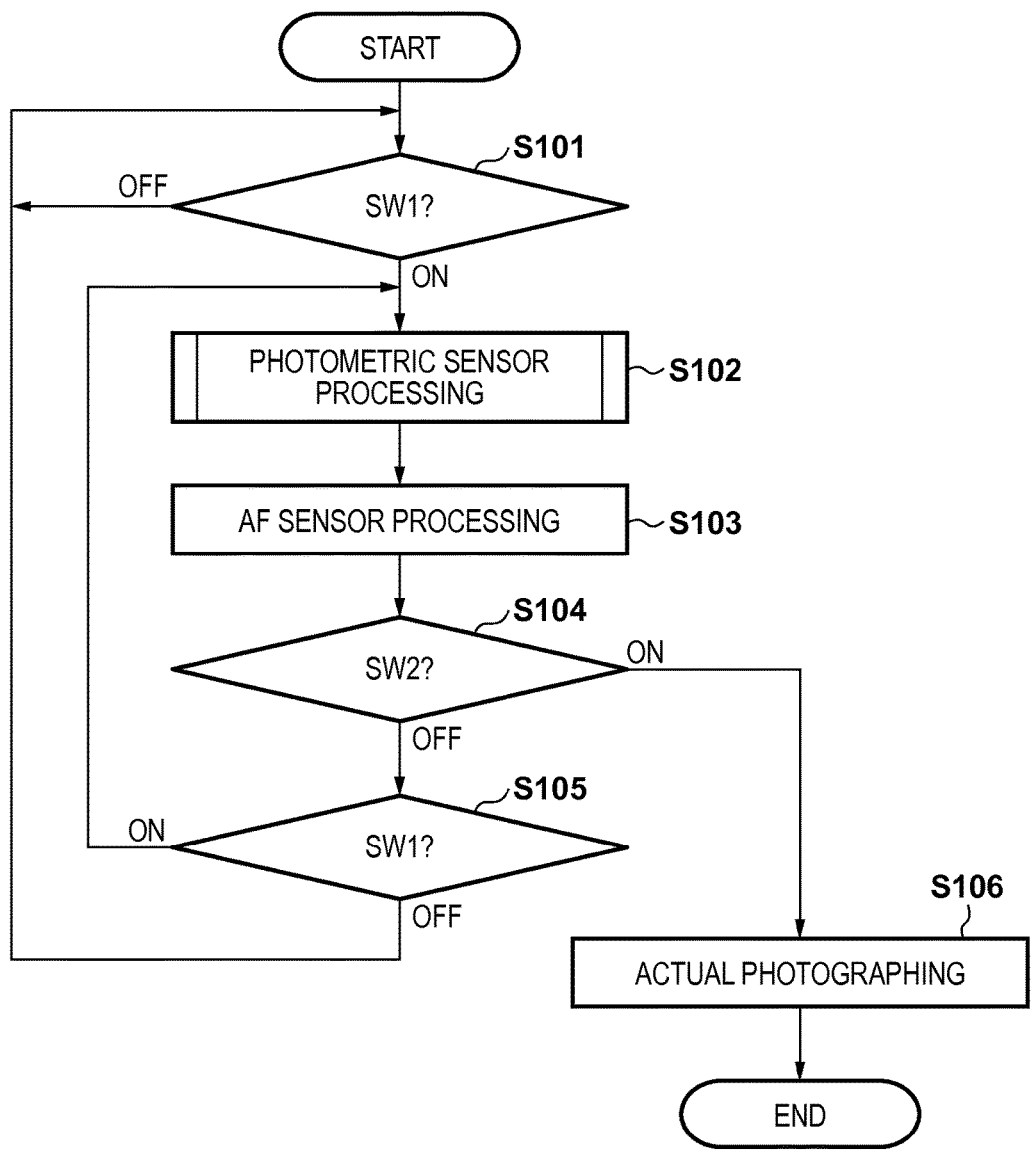
FIG. 2 is a flowchart illustrating photometric sensor processing in the image capturing apparatus in the first embodiment.
Figure 3:
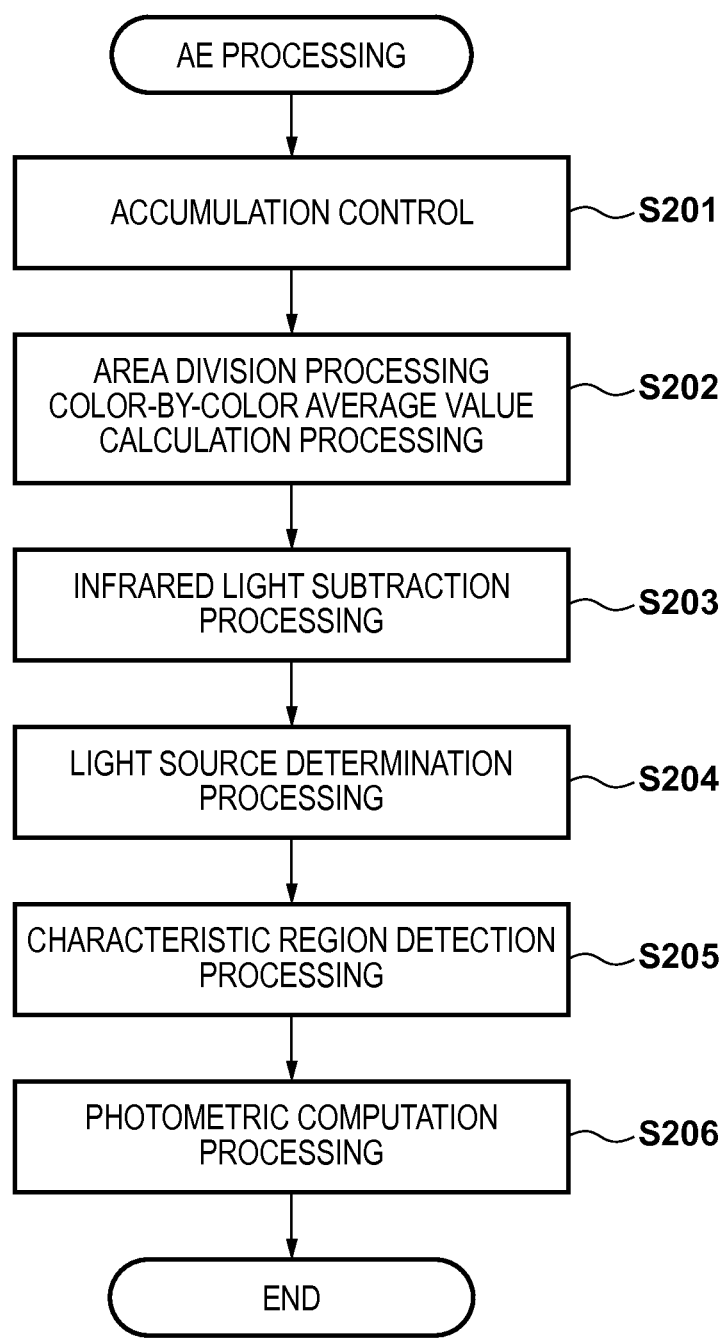
FIG. 3 is a flowchart illustrating photographic processing in the image capturing apparatus in the first embodiment.

FIG. 3 is a flowchart showing the details of the photometric sensor processing in step S102 in FIG. 2. In step S201, the ICPU 111 determines accumulation time (Tv) of the photometric sensor and performs photometric accumulation processing. In step S202, the ICPU 111 divides a captured image into a plurality of areas (pixel groups), and calculates (acquires) average values (image information) of R, G, B, and IR in each area. Note that the size of each area is any size, and the processing may transition to the next step S203 without calculating the average values.

In step S203, the ICPU 111 performs infrared light subtraction processing (processing for subtracting infrared light components) with respect to the average values of R, G, B, and IR of each area calculated in step S202, using the following equations.

$$R' = R - kr \times IR \quad \text{(Equation 1)}$$

$$G' = G - kg \times IR \quad \text{(Equation 2)}$$

$$B' = B - kb \times IR \quad \text{(Equation 3)}$$

Here, kr=1.0, kg=0.3, and kb=0.0.

In the above computation, a value obtained by applying a gain to the IR average value is subtracted from the average values of R, G, and B, thereby calculating (generating) R', G', and B' (visible light components) that have been subjected to the infrared light subtraction processing for each color. Note that the details of the infrared light subtraction processing will be described later with reference to FIGS. 4 to 11B.

In step S204, the ICPU 111 performs known light source determination processing. A light source determination processing result is used in image processing, such as automatic white balancing processing. In step S205, the ICPU 111 performs known characteristic region detection processing using R', G', and B'. The characteristic region detection processing is processing for detecting a characteristic region that satisfies a predetermined condition, such as a human face region or a specific color region, within an imaging screen. A result of this characteristic region detection processing is also used in AF processing, photometric processing, or the like, and favorable AF processing and photometric processing can be performed with respect to the characteristic region.

In step S206, the ICPU 111 calculates a photometric output value Y, which is obtained by adding integrated values R", G", and B" of R', G', and B' of each area calculated in step S203, at any ratio. Y is obtained by the following equation, for example.

$$Y = Ra \times R'' + Ga \times G'' + Ba \times B'' \quad \text{(Equation 4)}$$

A luminance value Y of each area is obtained by substituting appropriate values for mixing ratios Ra, Ga, and Ba of the R pixels, G pixels, and B pixels. For example, Ra=0.299, Ga=0.587, and Ba=0.114.

A weighted average value Yw of the photometric output value Y of each area and a later-described exposure control value weighting coefficient k is calculated by the following equation.

$$Yw = \Sigma Yij \times kij \quad \text{(Equation 5)}$$

Yij and kij indicate the photometric output value Y of each area and the exposure control value weighting coefficient k, respectively. i and j are area numbers respectively in the horizontal direction and the vertical direction, and the numbers to be summed change in accordance with the number of divided areas.

Then, the ICPU 111 calculates the exposure control values (shutter speed, f-number, sensitivity, etc.) for the actual photography, based on object luminance that is obtained from the weighted average value Yw, the accumulation time, and the like. Note that the method for determining the exposure control values does not directly relate to the present embodiment and may be any method, and therefore a detailed description thereof will be omitted.

The exposure control weighting coefficient k is a coefficient for changing the weight of the photometric output value of each photometric area in accordance with an image capturing mode, a photometric mode, a photographic scene, and the like of the camera 100. For example, if the photometric mode is a center-weighted photometric mode, the weighting coefficient for a photometric area near the image center is set higher than the weighting coefficient for the periphery of the image. If a characteristic region detection function is provided, when in an image capturing mode using the characteristic region detection function, the weighting coefficient for the photometric area corresponding to a characteristic region is set higher than the weighting coefficient for other photometric areas.

If a scene differentiation function of automatically differentiating among photographic scenes in accordance with a situation of a field is provided, a weighting coefficient that is most appropriate for a differentiated scene is set with respect to each photometric area. Since the exposure control weighting coefficient k does not directly relate to the present embodiment, a further detailed description thereof will be omitted.

Figure 5A:
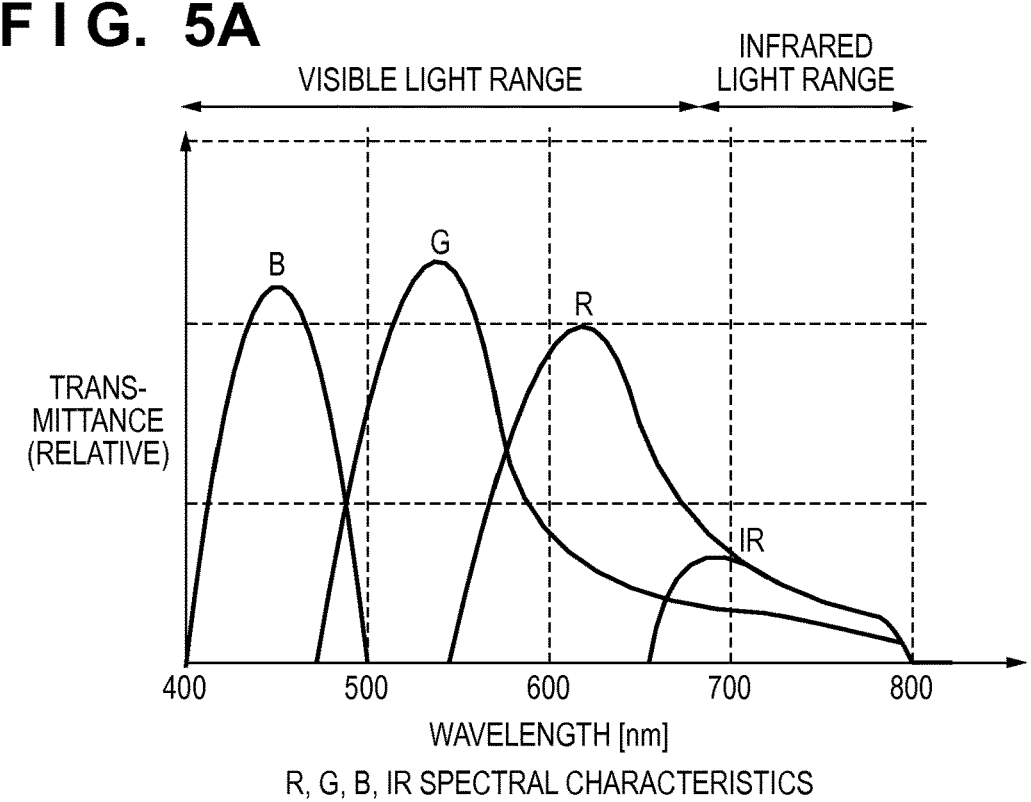
FIGS. 5A and 5B are diagrams for illustrating optical characteristics in the image capturing apparatus in the first embodiment.
Figure 5B:
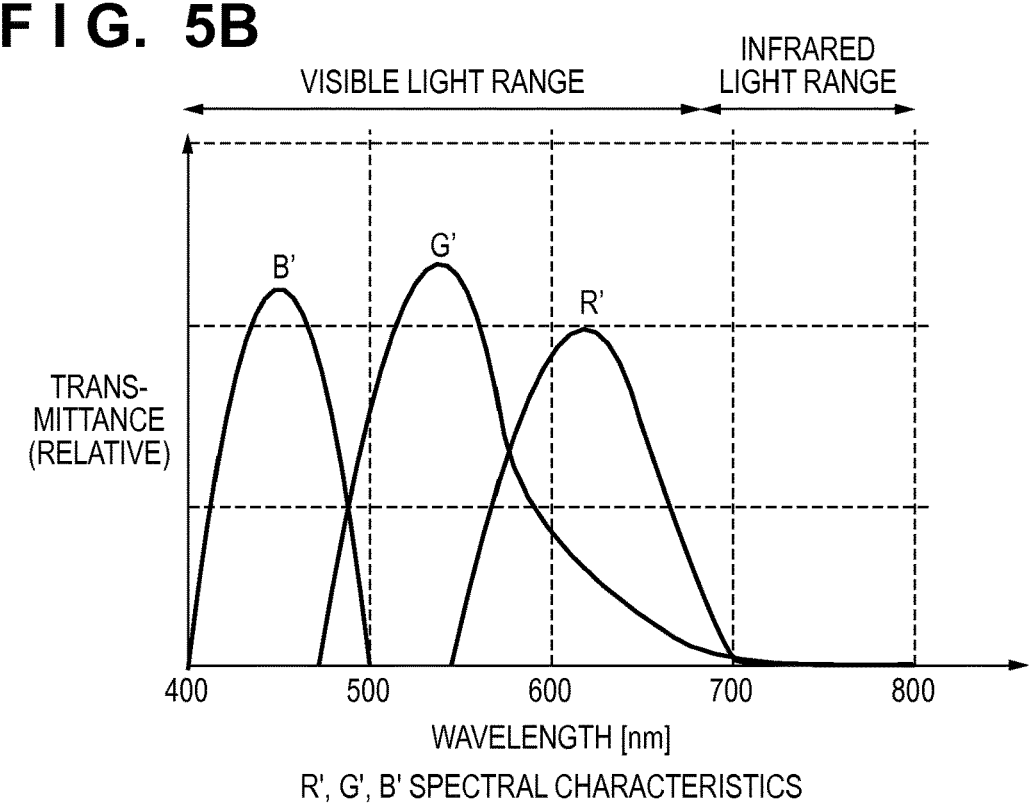

Next, photometric processing using the infrared light subtraction processing will be described using a diagram in FIG. 4 showing a state of a pixel array in the photometric sensor 106, and diagrams in FIGS. 5A and 5B showing optical characteristics of the color filters. The present embodiment will describe an example of using a CMOS sensor in which M×N pixels (M pixels in the vertical direction and N pixels in the horizontal direction) of R (red), G (green), B (blue), and IR (infrared light) are arranged on the same plane in a Bayer pattern, as shown in FIG. 4.

Figure 6:
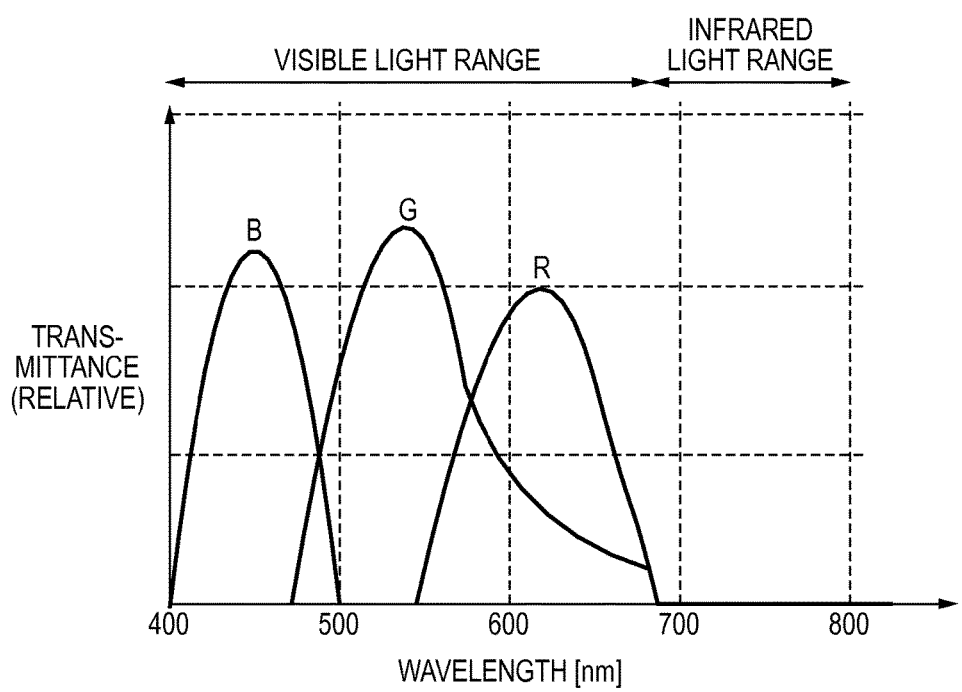
FIG. 6 is a diagram for illustrating optical characteristics in the image capturing apparatus in the first embodiment.

FIG. 5A shows spectral characteristics of R, G, B, and IR pixels in the photometric sensor 106. The R, G, and B pixels are more sensitive to visible light than to infrared light, and the IR pixels are sensitive to infrared light and are less sensitive to visible light than the R, G, and B pixels are. FIG. 6 shows spectral characteristics of the photographic image sensor 102. Note that the infrared cut filter in this example removes light in the infrared light range from 680 nm.

In the case (exposure amount determination processing) of determining the amount of exposure of the photographic image sensor 102 (spectral characteristics: FIG. 6) using the photometric output value Y calculated from the output of the R, G, and B pixels of the photometric sensor 106 (spectral characteristics: FIG. 5A), the amount of exposure shifts by a difference in the sensitivity to the infrared light range in some cases.

Figure 7A:
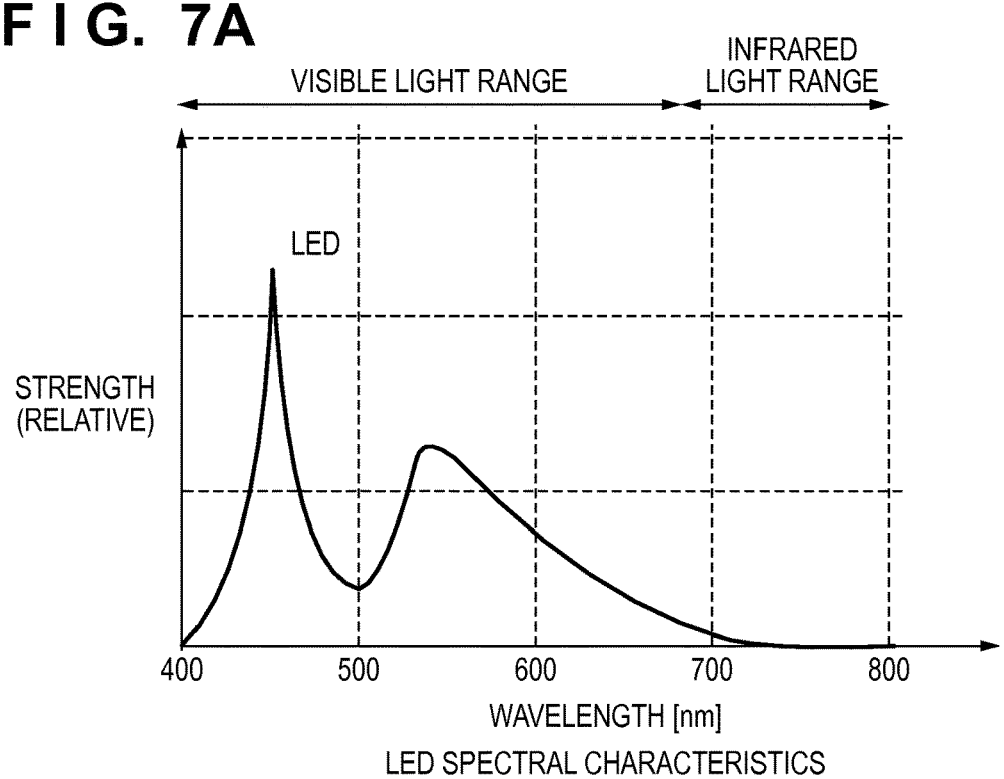
FIGS. 7A and 7B are diagrams for illustrating optical characteristics of light sources.

For example, the output of the photographic image sensor 102 is equal to the output of the photometric sensor 106 under an artificial light source such as an LED that emits a small amount of light in the infrared light range, as shown in FIG. 7A. That is to say, an image is shot by the photographic image sensor 102 at a proper exposure amount. However, in sunlight (during clear weather), which contains a larger amount of light in the infrared light range as in FIG. 7B, the output of the photometric sensor 106 is larger than that of the photographic image sensor 102 by a difference in the sensitivity to the infrared light range. That is to say, since the photometric sensor 106 detects an object that is brighter by the difference in the sensitivity to the infrared light range, a picture taken by the photographic image sensor 102 is underexposed. Thus, in the case of determining the amount of exposure of the photographic image sensor 102 (spectral characteristics: FIG. 6) using the output of the R, G, and B pixels in the photometric sensor 106 (spectral characteristics: FIG. 5A), a shift occurs due to the difference in the sensitivity to the infrared light range between the above two sensors.

For this reason, in order to bring R, G, and B spectral characteristics of the photometric sensor 106 closer to R, G, and B spectral characteristics of the photographic image sensor 102, the infrared light range components need to be subtracted. In this embodiment, R', G', and B' that have been subjected to the infrared light subtraction processing by (Equation 1) to (Equation 3) described above are calculated with respect to the output of the R, G, and B pixels of the photometric sensor 106.

FIG. 5B shows spectral characteristics of R', G', and B' that have been subjected to the infrared light subtraction processing, with respect to the output in FIG. 5A. It can be confirmed from FIGS. 5A, 5B, and 6 that the difference in the infrared light range between the spectral characteristics of the two sensors can be suppressed. That is to say, a shift in the amount of exposure caused by the difference in the sensitivity to the infrared light range can be suppressed by determining the amount of exposure of the photographic image sensor 102 (spectral characteristics: FIG. 4) using the photometric output value Y obtained by performing addition on the aforementioned R', G', and B' (spectral characteristics: FIG. 5B) at any ratio. With the above processing, the photometric computation processing and the like can be favorably performed.

Next, specific color detection processing using the infrared light subtraction processing will be described using FIGS. 8 to 11B.

In the extraction of a specific color, initially, light source determination processing is performed in a photographic environment, and automatic white balancing control is performed. This is a known technique for estimating color temperature of the light source using luminance information and color information obtained from an image within a screen, and adjusting gains of R, G, and B such that the outputs of the R, G, and B pixels are at the same level when photographing a white object.

Figure 8:
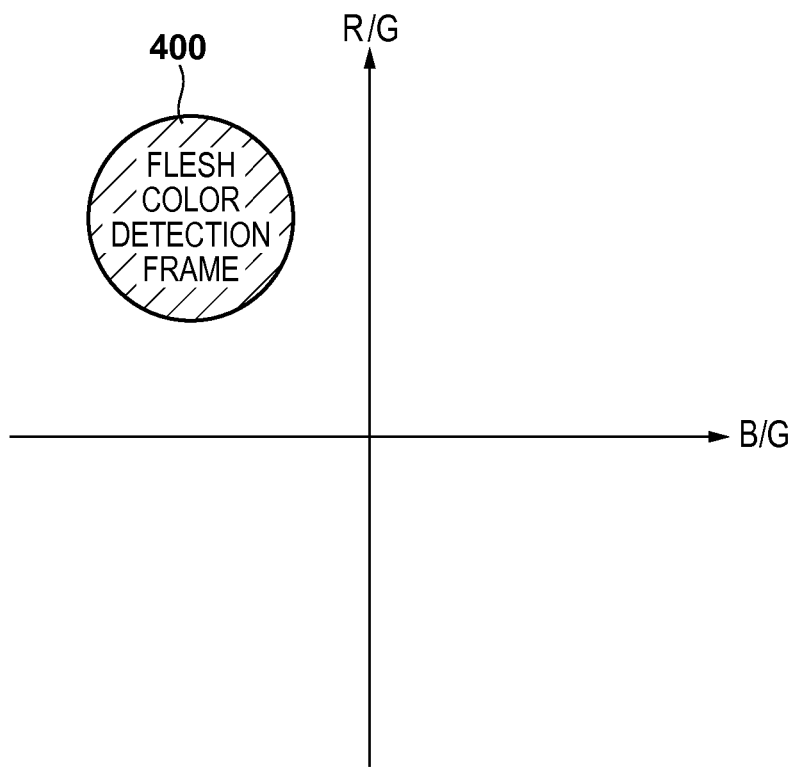
FIG. 8 is a diagram simplifying a color difference plane that serves as a reference when extracting a specific color.

FIG. 8 shows the output of the R, G, and B pixels of the photometric sensor 106 (spectral characteristics: FIG. 5A) that have been subjected to gain adjustment, as a simplified graph on a color difference plane with a vertical axis indicating R/G and a horizontal axis indicating B/G.

An average value of each color component in each area is used as a color difference signal between a B/G value and an R/G value, based on image data that has been subjected to white balancing control. Since the range where a specific color is plotted is predetermined in the two-dimensional plane (color space) of color difference signals, a specific color frame is determined from information of the specific color that has been sampled in advance in the color space, and it is determined whether or not each area is within the specific color frame in the color space.

For example, when extracting a flesh color as the specific color, it is known that the flesh color is present in the upper left (second quadrant) range in the color space shown in FIG. 8, and accordingly a flesh color detection frame 400 is set in the upper left range to extract the flesh color.

Figure 9A:
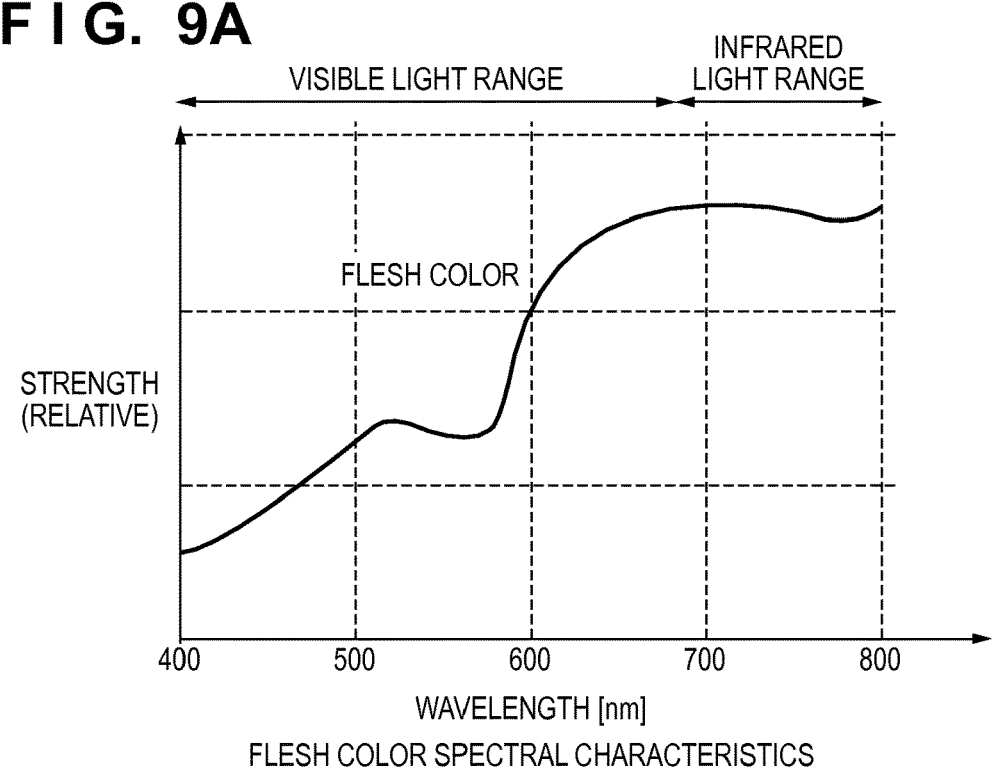
FIGS. 9A and 9B are diagrams for illustrating optical characteristics of an object.
Figure 9B:
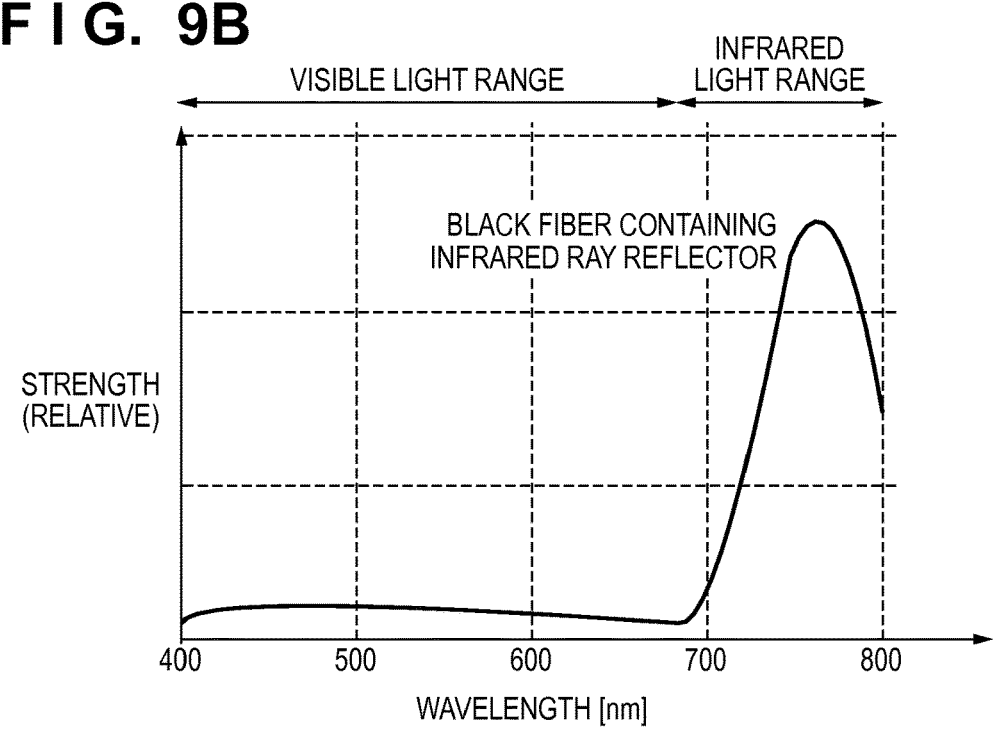
Figure 10A:
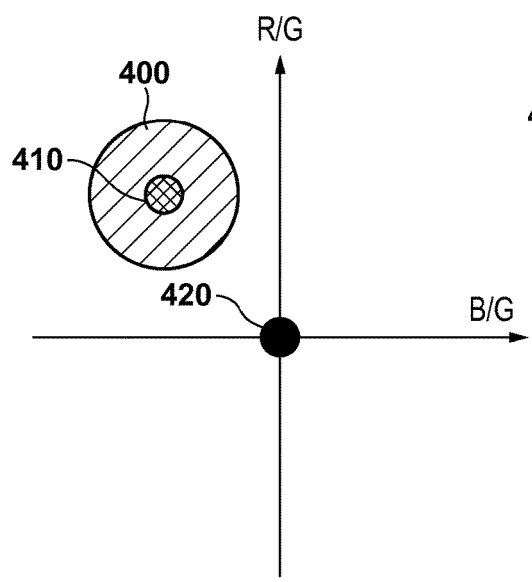
FIGS. 10A and 10B are diagrams simplifying a color difference plane that serves as a reference when extracting a specific color.
Figure 10B:
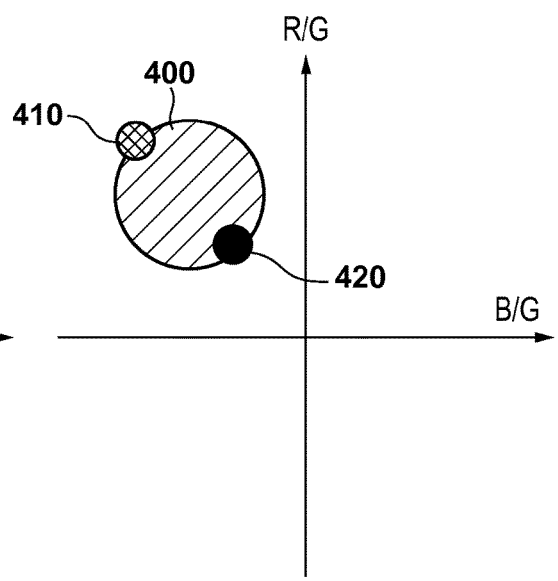

FIG. 9A shows spectral characteristics of the flesh color, and FIG. 9B shows spectral characteristics of black fiber containing an infrared reflector. FIGS. 10A and 10B show positions at which the flesh color coordinates 410 and the coordinates 420 of the black fiber containing the infrared reflector are plotted in the color difference plane in FIG. 8, when under the LED light source in FIG. 7A and when in sunlight (during clear weather) in FIG. 7B, respectively.

Under the LED light source (spectral characteristics: FIG. 7A) in FIG. 10A, the amount of light in the infrared light range is small, and accordingly the flesh color 410 is plotted within the flesh color detection frame 400. The black fiber 420 containing the infrared reflector is plotted at the color difference plane center, which indicates achromatic color.

Figure 7B:
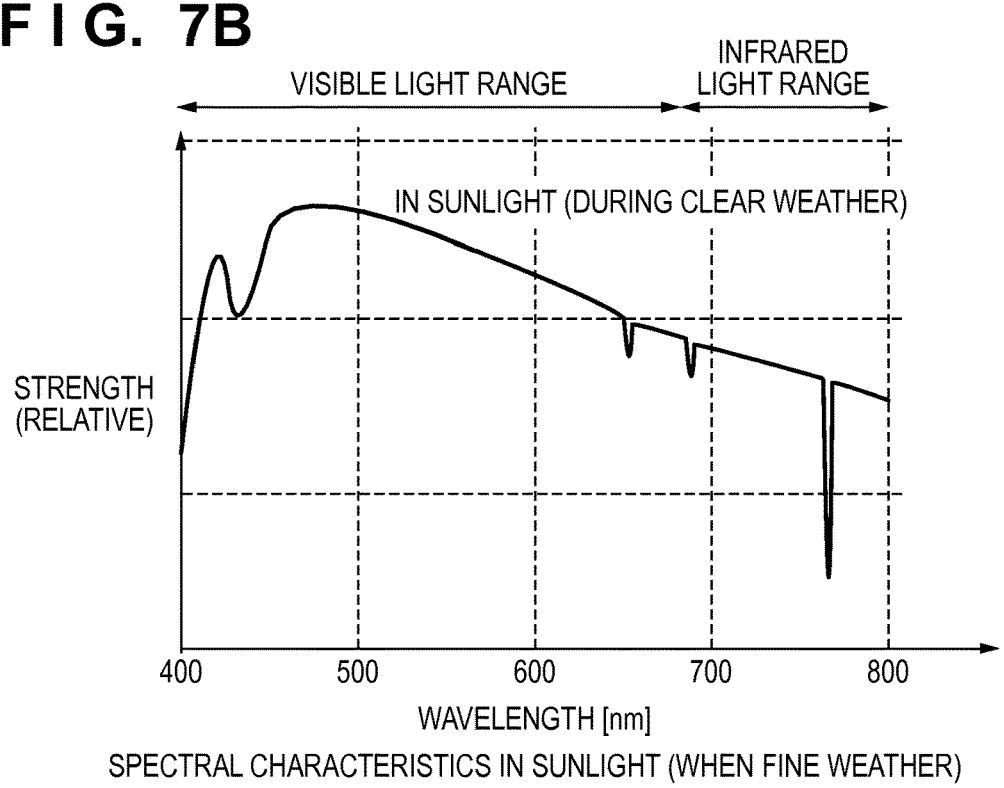

However, in sunlight (during clear weather) (spectral characteristics: FIG. 7B) in FIG. 10B, the amount of light in the infrared light range is larger than under the LED light source (spectral characteristics: FIG. 7A), and accordingly R/G is relatively large and B/G is relatively small with respect to those in FIG. 10A. That is to say, there are cases where the flesh color 410 is plotted outside the flesh color detection frame 400. There are also cases where the black fiber 420 containing the infrared reflector is plotted within the flesh color detection frame 400 and is detected as the flesh color by error. In the case of other materials that reflect more infrared rays as well, the plotted position shifts in the color difference plane depending on the light source, and therefore erroneous detection of colors may possibly occur.

Figure 11A:
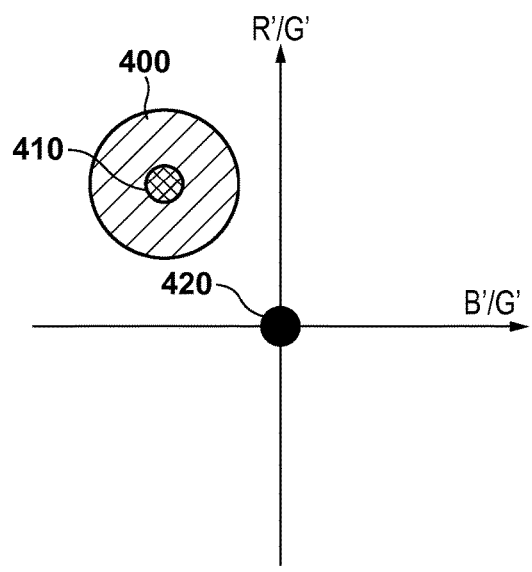
FIGS. 11A and 11B are diagrams simplifying a color difference plane that serves as a reference when extracting a specific color.
Figure 11B:
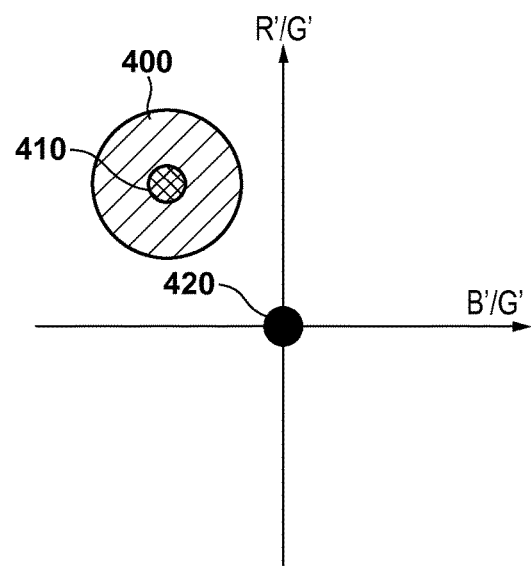

FIGS. 11A and 11B shows positions at which the flesh color 410 and the black fiber 420 containing the infrared reflector are plotted in the color space when under the LED light source in FIG. 7A and when in sunlight (during clear weather) in FIG. 7B, in a color difference plane after gain adjustment is performed on R', G', and B' (spectral characteristics: FIG. 5B) that have been subjected to the aforementioned infrared light subtraction processing.

The flesh color 410 is plotted within the flesh color detection frame 400 both when under the LED light source (spectral characteristics: FIG. 7A) in FIG. 11A and when in sunlight (during clear weather) (spectral characteristics: FIG. 7B) in FIG. 11B. The black fiber 420 containing the infrared reflector is plotted at the center of the color space that indicates achromatic color. By subtracting the infrared light range for each color by means of the infrared light subtraction processing, a shift in the plotted position in the color difference plane can be suppressed regardless of the presence of the infrared light of the light source. With the above processing, the light source determination processing, the specific color detection processing, and the like can be favorably performed. Although the photometric computation processing, the light source determination processing, and the specific color detection processing are performed using the infrared light subtraction processing in the present embodiment, it should be noted that a configuration may be employed in which at least one kind of processing is performed.

Second Embodiment

Next, a second embodiment of the present invention will be described. The outline of a configuration of the image capturing apparatus and photographic operations in the image capturing apparatus in the second embodiment are similar to those in the first embodiment shown in FIGS. 1 and 2. The second embodiment is different from the first embodiment in the photometric sensor processing in step S102 in FIG. 2. This difference will be described below.

Figure 12:
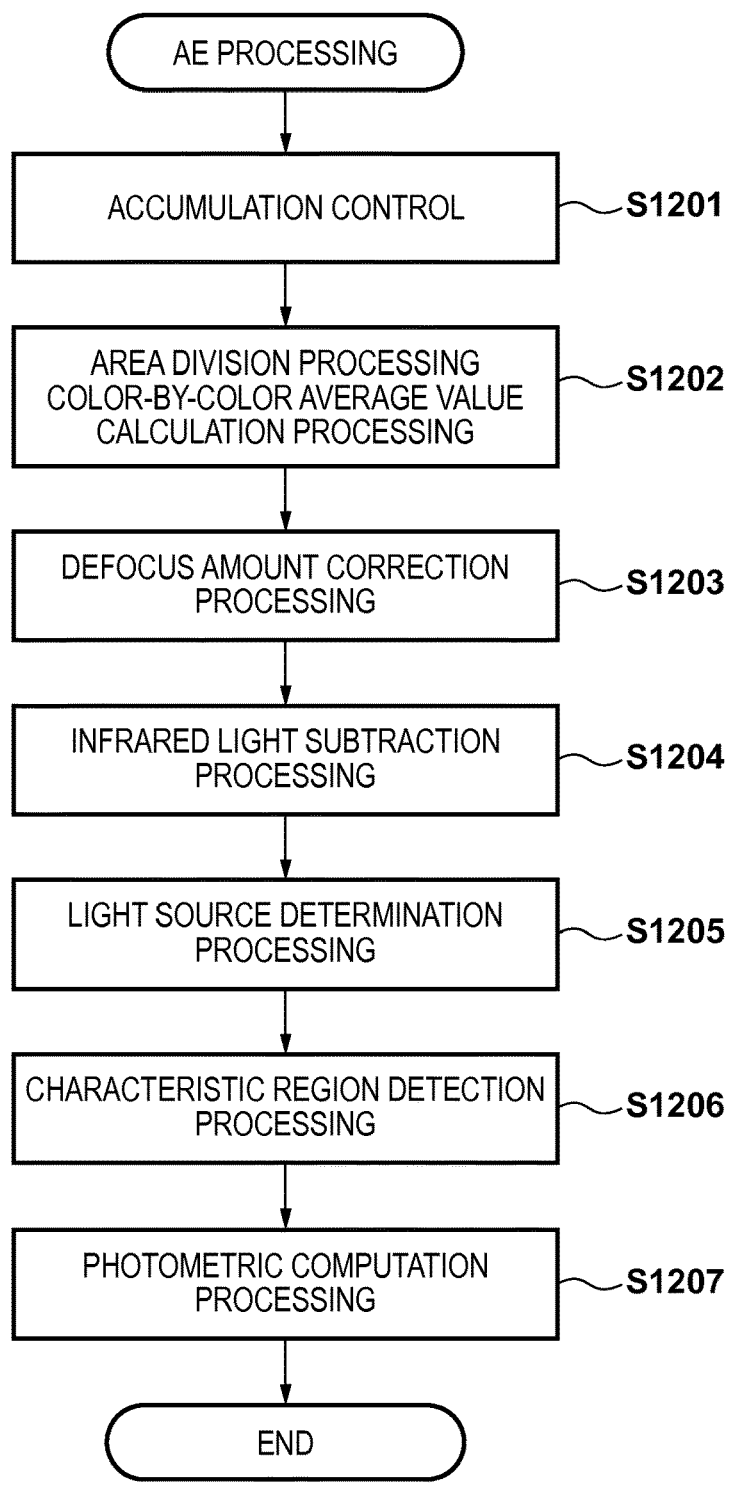
FIG. 12 is a flowchart illustrating photometric sensor processing in an image capturing apparatus in a second embodiment.

FIG. 12 is a flowchart showing the details of the photometric sensor processing in step S102 in FIG. 2. In step S1201, the ICPU 111 determines accumulation time (Tv) of the photometric sensor and performs photometric accumulation processing. In step S1202, the ICPU 111 divides a captured image into a plurality of areas (pixel groups), and calculates average values (image information) of R, G, B, and IR of each area. Note that the size of each area is any size, and the processing may transition to the next step S1203 without calculating the average value.

In step S1203, the ICPU 111 performs known defocus amount correction processing on the average values of R, G, B, and IR of each area calculated in step S1202. The defocus amount correction processing is processing for suppressing a focus shift in autofocus, in accordance with an output difference P between the visible light range and the infrared light range. The aforementioned output difference P is calculated by the following equation, for example.

$$P=(a1{\times}R+b1{\times}G+c1{\times}B+d1{\times}IR)/(a2{\times}R+b2{\times}G+c2{\times}B+d2{\times}IR) \quad \text{(Equation 6)}$$

Here, a1=1, b1=4, c1=1, d1=−10, a2=1, b2=1, c2=1, and d2=1. Note that the details of the defocus amount correction processing will be described later with reference to FIGS. 4 to 7A and 7B.

In step S1204, the ICPU 111 performs infrared light subtraction processing (processing for subtracting infrared light components) with respect to the average values of R, G, B, and IR of each area calculated in step S1202, using the following equations.

$$R'=R-kr{\times}IR \quad \text{(Equation 7)}$$

$$G'=G-kg{\times}IR \quad \text{(Equation 8)}$$

$$B'=B-kb{\times}IR \quad \text{(Equation 9)}$$

Here, kr=1.0, kg=0.3, and kb=0.0.

In the above computation, a value obtained by applying a gain to the IR average value is subtracted from the average values of R, G, and B, thereby calculating (generating) R', G', and B' (visible light components) that have been subjected to the infrared light subtraction processing for each color.

In step S1205, the ICPU 111 performs known light source determination processing. A light source determination processing result is used in image processing, such as automatic white balancing processing. In step S1206, the ICPU 111 performs known characteristic region detection processing using R', G', and B'. The characteristic region detection processing is processing for detecting a characteristic region that satisfies a predetermined condition, such as a human face region or a specific color region, within an imaging screen. A result of this characteristic region detection processing is also used in AF processing, photometric processing, or the like, and favorable AF processing and photometric processing can be performed with respect to the characteristic region.

In step S1207, the ICPU 111 calculates a photometric output value Y obtained by adding, at any ratio, R, G, and B of each area calculated in step S1202 or the integrated values of R', G', and B' of each area calculated in step S1204. Y is obtained by the following equation, for example. Here, assume that the integrated values of R, G, and B are R_int, G_int, and B_int, and the integrated values of R', G', and B' are R'_int, G'_int, and B'_int, respectively.

$$Y=Ra{\times}R\_\text{int}+Ga{\times}G\_\text{int}+Ba{\times}B\_\text{int} \quad \text{(Equation 10)}$$

$$Y=Ra{\times}R'\_\text{int}+Ga{\times}G'\_\text{int}+Ba{\times}B'\_\text{int} \quad \text{(Equation 11)}$$

A luminance value Y of each area is obtained by substituting appropriate values for mixing ratios Ra, Ga, and Ba of the R pixels, G pixels, and B pixels. For example, Ra=0.299, Ga=0.587, and Ba=0.114. Note that the details of the photometric computation processing will be described later with reference to FIGS. 4 to 7A and 7B.

A weighted average value Yw of the photometric output value Y of each area and a later-described exposure control value weighting coefficient k is calculated by the following equation.

$$Yw=\Sigma Yij{\times}kij \quad \text{(Equation 12)}$$

Yij and kij indicate the photometric output value Y of each area and an exposure control value weighting coefficient k, respectively. i and j are area numbers respectively in the horizontal direction and the vertical direction, and the numbers to be summed change in accordance with the number of divided areas.

Then, the ICPU 111 calculates the exposure control values (shutter speed, f-number, sensitivity, etc.) for the actual photography, based on object luminance that is obtained from the weighted average value Yw, the accumulation time, and the like. Note that the method for determining the exposure control values does not directly relate to the present embodiment and may be any method, and therefore a detailed description thereof will be omitted.

The exposure control value weighting coefficient k is a coefficient for changing the weight of the photometric output value of each photometric area in accordance with an image capturing mode, a photometric mode, a photographic scene, and the like of the camera 100. For example, if the photometric mode is a center-weighted photometric mode, the weighting coefficient for a photometric area near the image center is set higher than the weighting coefficient for the periphery of the image. If a characteristic region detection function is provided, when in an image capturing mode using the characteristic region detection function, the weighting coefficient for the photometric area corresponding to a characteristic region is set higher than the weighting coefficient for other photometric areas.

If a scene differentiation function of automatically differentiating among photographic scenes in accordance with a situation of a field is provided, a weighting coefficient that is most appropriate for a differentiated scene is set with respect to each photometric area. Since the exposure control value weighting coefficient k does not directly relate to the present embodiment, a further detailed description thereof will be omitted.

Next, defocus amount correction, light source determination, specific color detection, and photometric computation processing will be described using the already-described diagram in FIG. 4 showing the pixel array of the photometric sensor 106, the diagrams in FIGS. 5A and 5B showing optical characteristics of the color filters, the diagram in FIG. 6 showing the spectral characteristics of the photographic image sensor 102, and the diagrams in FIGS. 7A and 7B showing the spectral characteristics of the light sources.

The present embodiment will describe an example of using a CMOS sensor in which M×N pixels (M pixels in the vertical direction and N pixels in the horizontal direction) of R (red), G (green), B (blue), and IR (infrared light) are arranged in a Bayer pattern, as shown in FIG. 4.

FIG. 5A shows spectral characteristics of R, G, B, and IR pixels in the photometric sensor 106. FIG. 5B shows spectral characteristics of R', G', and B' that have been subjected to the infrared light subtraction processing, with respect to the output in FIG. 5A. FIG. 6 shows spectral characteristics of the photographic image sensor 102. Note that the infrared cut filter in this example removes light in the infrared light range from 680 nm. It can be confirmed from FIGS. 5B and 6 that the difference in the infrared light range between the spectral characteristics of the two sensors can be suppressed.

However, with the computation in the infrared light subtraction processing (Equation 7) to (Equation 9), a computation error occurs due to multiplication and difference computation in some cases. In general, computation is performed using an integer type, in order to reduce the amount of computation and reduce a circuit scale. In order to express the first decimal place of kr, kg, and kb, values of 10 times of kr, kg, and kb are multiplied, and thereafter the resultant values are divided by 10. When the average values of the respective colors calculated in step S1202 are R=100, G=200, B=50, and IR=40, results of the infrared light subtraction processing in step S1204 are R'=60, G'=188, and B'=46 from (Equation 7) to (Equation 9). When the average values of the respective colors calculated in step S1202 are R=10, G=20, B=5, and IR=4, which are 10% of the above values, results of the infrared light subtraction processing in step S1204 are R'=6, G'=19, and B'=5 from (Equation 7) to (Equation 9).

As described above, even if the ratio of the average values R, G, and B of the respective colors is the same, the ratio of R', G', and B' after the computation may possibly change. The aforementioned change of the ratio occurs when R, G, and B are small, and causes a computation error. For the above-described reason, in processing which does not require the infrared light subtraction processing, it is desirable to use the average values R, G, and B of the respective colors.

In the defocus amount correction processing in step S1203, the ratio between the visible light range and the infrared light range need only be detected. For this reason, the output difference P is calculated from (Equation 6) using the average values R, G, and B of the respective colors. In the light source determination processing in step S1205 and the characteristic region detection processing in step S1206, the processing is performed using R', G', and B' that have been subjected to the infrared light subtraction processing in step S1204, in order to suppress a hue shift between when under an artificial light source such as an LED that emits a small amount of light in the infrared light range as in FIG. 7A and when in sunlight (during clear weather) that contains a large amount of light in the infrared light range as in FIG. 7B.

In the photometric computation processing in step S1207, the photometric output value Y is calculated from (Equation 11) using R', G', and B' that have been subjected to the infrared light subtraction processing in step S1204, in order to suppress a spectral sensitivity difference between the photometric sensor 106 and the photographic image sensor 102.

However, when the average values R, G, and B of the respective colors calculated in step S1202 are small, the aforementioned computation error occurs. For this reason, the photometric output value Y may be calculated from (Equation 10) using the average values R, G, and B of the respective colors. At this time, although a shift occurs in a photometric computation result by a spectral sensitivity difference between the photometric sensor 106 and the photographic image sensor 102, the aforementioned computation error can be suppressed.

Also, the equation for calculating the photometric output value Y may be switched in accordance with the output of the average values R, G, and B of the respective colors calculated in step S1202. For example, (Equation 11) is used if the average values R, G, and B of the respective colors are higher than a certain threshold value, and (Equation 10) is used in the computation if smaller.

Next, the specific color detection processing using the infrared light subtraction processing in FIGS. 8 to 11B is the same as that in the first embodiment.

Next, the defocus amount correction processing will be described using FIGS. 13A and 13B. The focus detection circuit 109 computes the defocus amount def by a known focus detection method using a phase difference. Here, each light beam that has been transmitted through the lens 200 is divided into two light beams by a beam splitter, optical axes of the divided light beams are shifted from each other, the focus detection sensor is caused to form an image using two imaging lenses, and the defocus amount def is calculated based on a phase difference between the two formed images. The lens 200 is then driven to focus in accordance with the defocus amount.

Figure 13A:
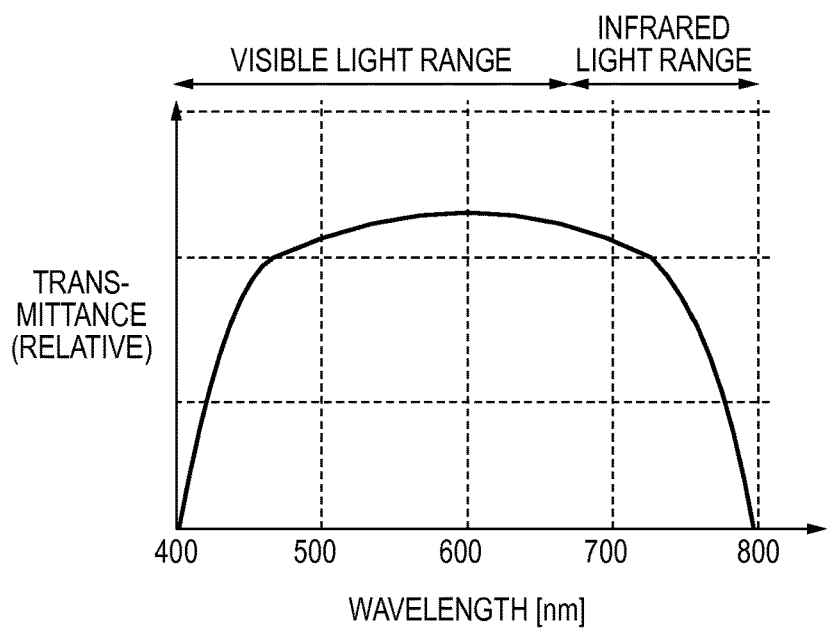
FIGS. 13A and 13B are diagrams for illustrating defocus amount correction.
Figure 13B:
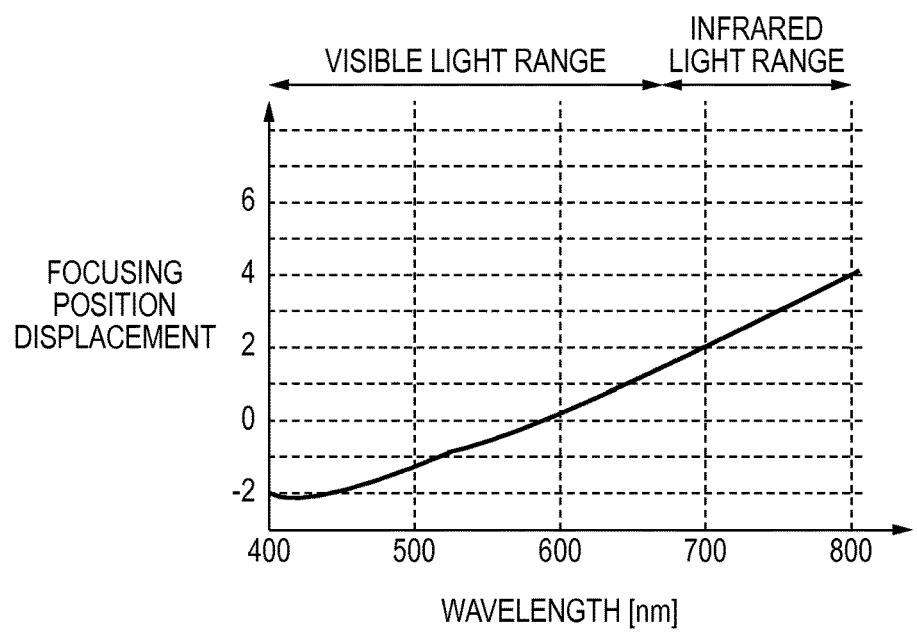

FIG. 13A shows spectral characteristics of the focus detection circuit 109. In the case where a focusing operation cannot be performed due to a low luminance, near infrared (about 700 nm) light is radiated to an object from a light-emitting diode on the camera side, and therefore the focus detection circuit 109 is sensitive to a longer wavelength region than the spectral characteristics of the photographic image sensor 102 in FIG. 6 by about 100 nm. FIG. 13B is a diagram showing a displacement of a relative focusing position of the lens 200 due to a chromatic aberration with respect to the light wavelength.

If the light source that illuminates the object is an LED (spectral characteristics: FIG. 7A) having a small amount of components in the infrared light range, the center of the spectral distribution of the light source is in the vicinity of 500 nm, which is in the visible light range, and accordingly the displacement occurs in a direction in which the focal length of the lens shortens. On the other hand, if the light source that illuminates the object is the sunlight (spectral characteristics: FIG. 7B) having a large amount of components in the infrared light range, the displacement occurs in a direction in which the focal length of the lens extends. For this reason, a problem arises in that, even if the object is located at the same position, the focus shifts on the imaging plane side as a result.

The photometric sensor 106 (spectral characteristics: FIG. 5A) can detect a plurality of spectral sensitivities. If the output of this sensor is substituted in (Equation 6), the output difference P is a positive value as the light source that illuminates the object contains a large amount of short wavelength components. The output difference P is a negative value as the light source that illuminates the object contains a large amount of long wavelength components.

The defocus amount correction value (correction amount) is calculated using the output difference P. That is to say, assuming that the defocus amount is def and the focusing correction coefficient is k, a final defocus amount is calculated by (Equation 13).

Final defocus amount=$k \times P$+def (Equation 13)

With this computation, the displacement in the focusing direction can be corrected.

Note that the defocus amount correction value may be obtained by creating a table data corresponding to the value of the output difference P and referencing this data. In the case of calculation of (Equation 6), computation can be performed using R', G', and B' that have been subjected to the infrared light subtraction processing, as well as IR, whereas the accuracy decreases due to a computation error, as mentioned above. For this reason, it is desirable to perform computation using R, G, B, and IR. Although the displacement in the focusing direction is corrected by performing the defocus amount correction processing in the present embodiment, focus control value correction processing may be performed with other control values relating to focusing (focus control values) such as a lens drive amount as a correction target.

With the above processing, the defocus amount correction, the light source determination, the specific color detection, the photometric computation processing, and the like can be favorably performed. Note that, regarding the photometric computation processing and the face region detection processing, if the infrared light subtraction processing is performed when the amount of R, G, and B signals is small, as in the case of a night view photographic scene, there are cases where the photometric computation processing and the face region detection processing cannot be accurately performed since the amount of R, G, and B signals is too small. For this reason, a configuration may be employed in which the photometric computation processing and the face region detection processing are performed without performing the infrared light subtraction processing.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-123807 and 2014-123809, filed Jun. 16, 2014, which are hereby incorporated by reference herein in their entirety.

What is claimed is:

1. An image capturing apparatus comprising:
   a first image sensor in which a first pixel group whose sensitivity to visible light is higher than a sensitivity thereof to infrared light, and a second pixel group that has a sensitivity to infrared light and has a lower sensitivity to visible light than that of the first pixel group, are arranged on the same plane;
   at least one processor; and
   at least one non-transitory memory device having computer executable instructions stored thereon, which when executed by the at least one processor, causes the at least one processor to:
   calculate a first evaluation value based on a pixel signal of the first pixel group without subtracting an infrared light component that is based on a pixel signal of the second pixel group from the pixel signal of the first pixel group;
   calculate a second evaluation value by subtracting the infrared light component that is based on the pixel signal of the second pixel group from the pixel signal of the first pixel group or the first evaluation value;
   perform a first processing based on the first evaluation value; and
   perform a second processing that is different from the first processing based on the second evaluation value,
   wherein the second processing includes at least one of processing for light source determination and processing for detecting a specific color.

2. The image capturing apparatus according to claim 1, further comprising:
   a second image sensor that is different from the first image sensor,
   wherein the first processing and the second processing are processing relating to image capturing using the second image sensor.

3. The image capturing apparatus according to claim 1, wherein the first processing is processing for determining an exposure control value.

4. The image capturing apparatus according to claim 1, wherein the first processing is autofocus processing.

5. The image capturing apparatus according to claim 1, wherein the first processing is processing for detecting a face region of an object from an image generated based on the pixel signal of the first pixel group.

6. The image capturing apparatus according to claim 1, wherein the processing for detecting a specific color is processing for detecting a specific color region from an image generated based on the pixel signal of the first pixel group and the pixel signal of the second pixel group.

7. The image capturing apparatus according to claim 1, wherein the first processing is processing for dividing a light beam that has been transmitted through a lens into two light beams and calculating a correction amount for a defocus amount detected based on a phase difference between two images formed by the light beams obtained from the division.

8. The image capturing apparatus according to claim 1, wherein the first evaluation value is calculated in each of a plurality of divided regions each including some pixels in the first pixel group and some pixels in the second pixel group, and
the second evaluation value is calculated in each of the plurality of regions.

9. The image capturing apparatus according to claim 1, wherein the first pixel group includes a plurality of pixels having different sensitivities to infrared light, and
the second calculation unit determines an amount of an infrared light component to be subtracted from pixel signals of the plurality of pixels, based on a sensitivity to infrared light of each of the plurality of pixels.

10. A method for controlling an image capturing apparatus having a first image sensor in which a first pixel group whose sensitivity to visible light is higher than a sensitivity thereof to infrared light, and a second pixel group that has a sensitivity to infrared light and has a lower sensitivity to visible light than that of the first pixel group, are arranged on the same plane, the method comprising:
calculating a first evaluation value based on a pixel signal of the first pixel group without subtracting an infrared light component that is based on a pixel signal of the second pixel group from the pixel signal of the first pixel group;
calculating a second evaluation value by subtracting the infrared light component that is based on the pixel signal of the second pixel group from the pixel signal of the first pixel group or the first evaluation value;
performing a first processing based on the first evaluation value; and
performing a second processing that is different from the first processing based on the second evaluation value,
wherein the second processing includes at least one of processing for light source determination and processing for detecting a specific color.

11. A non-transitory computer-readable storage medium storing a program for causing a computer execute a method for controlling an image capturing apparatus having a first image sensor in which a first pixel group whose sensitivity to visible light is higher than a sensitivity thereof to infrared light, and a second pixel group that has a sensitivity to infrared light and has a lower sensitivity to visible light than that of the first pixel group, are arranged on the same plane, the method comprising:
calculating a first evaluation value based on a pixel signal of the first pixel group without subtracting an infrared light component that is based on a pixel signal of the second pixel group from the pixel signal of the first pixel group;
calculating a second evaluation value by subtracting the infrared light component that is based on the pixel signal of the second pixel group from the pixel signal of the first pixel group or the first evaluation value;
performing a first processing based on the first evaluation value;
performing a second processing that is different from the first processing based on the second evaluation value,
wherein the second processing includes at least one of processing for light source determination and processing for detecting a specific color.

\* \* \* \* \*